(12) United States Patent  
Yang et al.

(10) Patent No.: US 7,130,108 B2
(45) Date of Patent: Oct. 31, 2006

(54) DISPLAY MEMBERS

(75) Inventors: San-Ming Yang, Mississauga (CA); Thomas Enright, Tottenham (CA); Val Magdalinis, Aurora (CA); Mike Hawkins, Cambridge (CA); Ahmed Alzamly, Mississauga (CA); Man-Chung Tam, Mississauga (CA); Peter M. Kazmaier, Mississauga (CA); Marko Saban, Etobicoke (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 11/093,083

(22) Filed: Mar. 29, 2005

(65) Prior Publication Data

US 2006/0039181 A1 Feb. 23, 2006

Related U.S. Application Data

(63) Continuation-in-part of application No. 10/919,814, filed on Aug. 17, 2004.

(51) Int. Cl.
G02B 26/00 (2006.01)

(52) U.S. Cl. .................. 359/296; 359/238; 345/107
(58) Field of Classification Search ............... 359/238, 359/296, 297, 280; 345/107
See application file for complete search history.

(56) References Cited

U.S. PATENT DOCUMENTS

| 3,586,645 | A | * | 6/1971 | Granger et al. ............... 521/78 |
| 4,126,854 | A | | 11/1978 | Sheridon |
| 4,143,103 | A | | 3/1979 | Sheridon |
| 5,262,098 | A | | 11/1993 | Crowley et al. |
| 5,344,594 | A | | 9/1994 | Sheridon |
| 5,389,945 | A | | 2/1995 | Sheridon |
| 5,604,027 | A | | 2/1997 | Sheridon |
| 5,708,525 | A | | 1/1998 | Sheridon |
| 5,717,514 | A | | 2/1998 | Sheridon |
| 5,739,801 | A | | 4/1998 | Sheridon |
| 5,754,332 | A | | 5/1998 | Crowley |
| 5,808,525 | A | | 9/1998 | Tanno et al. |
| 5,815,306 | A | | 9/1998 | Sheridon et al. |
| 5,825,529 | A | | 10/1998 | Crowley |
| 5,900,192 | A | | 5/1999 | Richley |
| 5,976,428 | A | | 11/1999 | Richley |
| 5,989,629 | A | | 11/1999 | Sacripante et al. |
| 6,054,071 | A | | 4/2000 | Mikkelsen, Jr. |
| RE37,085 | E | | 3/2001 | Sheridon |
| 6,232,027 | B1 | * | 5/2001 | Matsunaga et al. ...... 430/108.3 |
| 6,235,395 | B1 | | 5/2001 | Sacripante et al. |
| 6,419,982 | B1 | | 7/2002 | Sacripante et al. |
| 6,441,946 | B1 | | 8/2002 | Sheridon |
| 6,445,490 | B1 | | 9/2002 | Chopra et al. |
| 6,549,327 | B1 | * | 4/2003 | Foucher et al. ............. 359/296 |

(Continued)

OTHER PUBLICATIONS

U.S. Appl. No. 10/397,017, filed Mar. 25, 2003, entitled "Continuous Combined Pigmented Wax Compounding and Bichromal Sphere Fabrication Process".

(Continued)

Primary Examiner—Timothy Thompson
Assistant Examiner—Jerry Fang
(74) Attorney, Agent, or Firm—Pepper Hamilton LLP (57) ABSTRACT

A display member for use at a temperature greater than at least about 40° C. The display member includes an arrangement of a plurality of optically anisotropic rotatable elements comprising a purified polymer. The plurality of rotatable elements have a surface in contact with an enabling fluid, the rotatable elements being electrically dipolar in the presence of the enabling fluid and being subject to rotation upon application of an electric field.

15 Claims, 4 Drawing Sheets

U.S. PATENT DOCUMENTS

| | | | |
|---|---|---|---|
| 6,554,071 B1 * | 4/2003 | Reedy et al. | 166/293 |
| 6,703,074 B1 | 3/2004 | Sacripante et al. | |
| 6,795,228 B1 | 9/2004 | Sacripante et al. | |
| 2001/0018513 A1 * | 8/2001 | Baker | 536/25.41 |
| 2003/0146908 A1 | 8/2003 | Favalora et al. | |
| 2004/0081695 A1 * | 4/2004 | Sowden et al. | 424/471 |

OTHER PUBLICATIONS

U.S. Appl. No. 10/886,377, filed Jul. 7, 2004 entitled "Display Member Incorporating a Patterned Adhesive Layer".

* cited by examiner

DISPLAY MEMBERS

CROSS-REFERENCE TO RELATED APPLICATION

This application is a continuation-in-part of U.S. patent application Ser. No. 10/919,814, filed Aug. 17, 2004 entitled, "Bichromal Balls", which is incorporated herein by reference in its entirety.

BACKGROUND

1. Technical Field

The description set forth herein relates generally to the field of visual displays and reusable display technology. More particularly, the description relates to a readdressable media, such as electric paper, including display members for use in elevated temperature applications.

2. Description of Related Art

Displays having rotatable elements provide numerous advantages over conventional electrically addressable visual displays, such as LCD and CRT displays. In particular, they are suitable for viewing in ambient light, they retain an image indefinitely in the absence of an applied electric field, and they can be made lightweight, flexible, foldable, and with many other familiar and useful characteristics of ordinary writing paper. Thus, at least in principle, they are suitable both for display applications and for so-called electric paper or interactive paper applications, in which they serve as an electrically addressable, reusable substitute for ordinary paper. For further advantages of such displays, see for example, U.S. Pat. No. 5,389,945, which is herein incorporated by reference.

Rotating element display material has also been disclosed in U.S. Pat. Nos. 4,126,854, 4,143,103 and 5,389,945, each herein incorporated by reference. The rotating element display material generally includes a substrate, a dielectric fluid and a set of rotatable elements. The rotating elements are embedded in an elastomer material which is then cured and swelled to create cavities around the elements.

The rotating elements, also referred to as bichromal spheres or bichromal balls, are optically and electronically anisotropic. For example, a rotating element has two distinct hemispheres, one black and one white, with each hemisphere having a distinct electrical characteristic giving it a dipole moment with respect to a dielectric fluid. An image is formed on the electric paper by applying an external electric field which rotates the bichromal sphere differentiated by the contrasting charges of the two hemispheres of the rotating element. The difference in charges between the hemispheres of the ball causes the ball to act like a dipole in the presence of an electrical field, which in turn causes the ball to rotate until its dipole vector lines up in the direction of the externally applied electric field. The image may stay in place until a new voltage pattern is applied, which erases the previous image and generates a new one.

Current multichromal display devices are often produced by the "swollen sheet" method. In this method, bare multichromal beads, randomly mixed and dispersed in a silicone elastomeric sheet, are rendered rotatable by swelling the elastomer in silicone oil. Pockets of oil form around each bead, and the beads detach from the elastomer-bead interface. The resulting device thus includes a swollen elastomeric coating of bichromal particles. Additional details about the swollen sheet production method may be found in, for example, U.S. Pat. No. 6,441,946, which is incorporated herein by reference in its entirety.

Numerous patents describe rotational elements, their manufacture, incorporation in display systems or substrates, and related uses and applications. Exemplary patents include, but are not limited to: U.S. Pat. Nos. 5,262,098; 5,344,594; 5,604,027 reissued as Re 37,085; U.S. Pat. Nos. 5,708,525; 5,717,514; 5,739,801; 5,754,332; 5,815,306; 5,900,192; 5,976,428; 6,054,071; 5,989,629; 6,235,395; 6,419,982; 6,445,490; and 6,703,074, all of which are hereby incorporated by reference.

Display members are commonly used for indoor electronic signage applications. Outdoor applications are limited because the base polymer used in media is a nonfunctional polyethylene, such as POLYWAX® 1000 or POLYWAX® 2000 from Baker Petrolite Corporation, Sugarland, Tex. The reason for the limited application is that at higher temperatures, it is believed that a fraction of the POLYWAX® leaches out to silicone fluid typically utilized inside the device, such as at about 50° C. to about 60° C. These unwanted materials are then carried or dispersed in the silicone fluid, thereby hindering bead rotation. As a result, the optical performances of the display members or devices are significantly reduced. At present, the application temperature must generally be maintained below about 40° C. by various cooling methods, which in turn are costly and there is no successful method to prevent the noted leaching difficulties described generally above.

Accordingly, there is a need for display members and related devices having improved optical performance at elevated temperatures.

SUMMARY

An embodiment includes a display member for use at a temperature greater than at least about 40° C. The display member includes an arrangement of a plurality of optically anisotropic rotatable elements including a purified polymer. The plurality of rotatable elements may have a surface in contact with an enabling fluid. The rotatable elements may be electrically dipolar in the presence of the enabling fluid and rotate upon application of an electric field.

The rotatable elements may include a polyalkylene including at least one polyethylene wax. The purified polymer may include polyalkylenes having molecular weights from about 700 to about 3,000. The purified polymer may have an average molecular weight greater than an initial average molecular weight. The purified polymer preferably prevents leaching into the enabling liquid. At least one material having an average molecular weight of less than about 700 may be extracted from the rotatable elements to form the purified polymer. The enabling fluid may include a dielectric liquid. The rotatable elements may be disposed in cavities in a substrate. The cavities may also include the enabling fluid.

In another embodiment, an image formation member includes a conductive substrate, an adhesive layer on the substrate, and a plurality of rotatable elements on the adhesive layer. The rotatable elements may include a polymer having extracted therefrom, materials having an average molecular weight of less than about 700 and a conductive layer positioned over the rotatable element and opposite from the adhesive layer.

The adhesive layer may be patterned. The rotatable elements may be positioned in a monolayer in a pattern that substantially corresponds to the pattern of the patterned adhesive layer. The conductive layer may be positioned over the rotatable elements and opposite from the patterned adhesive layer. The rotatable elements may include a polyalkylene. The material extracted from the rotatable elements may include a polyethylene wax having a low average molecular weight. The image formation member may operate at a temperature greater than at least about 40° C. The polymer may prevent leaching at a temperature greater than about 40° C. The polymer may have an average molecular weight greater than an initial average molecular weight.

Another embodiment includes an electronic device. The electronic device includes two opposing outer surfaces and a plurality of optically and electrically anisotropic rotatable elements including a purified polymer disposed in the substance capable of being liquefied. The substance includes a dielectric fluid. A rotatable disposition of each rotatable element may be achievable while the rotatable element is disposed in the substance. The rotatable element, when in the rotatable disposition, may not be attached to the substance but suspended in the substance capable of being liquefied. At least one material having an average molecular weight of less than about 700 may be extracted from the rotatable elements to form the purified polymer. The purified polymer may include polyalkylenes having molecular weights from about 700 to about 3,000. The polymer may have an average molecular weight greater than an initial average molecular weight.

Another embodiment includes a display member having rotatable elements with hemispheres of a first polymer and a second polymer. Low molecular weight materials, for example less than about 700, may be extracted from the first polymer and the second polymer. The first polymer and the second polymer may have different pigmentations. The rotatable element may be used in applications at a temperature of up to at least about 40° C. or more. In embodiments, it may be used at temperatures of up to about 70° C.

DETAILED DESCRIPTION

The terms "bead", "particle", "capsule" and "bichromal" are used interchangeably to refer to a rotatable element for a display medium, such as a twisting cylinder, microcapsule, bead, electrophoretic material or any other bichromal or multichromal material that may be modulated by an applied electric or magnetic field. For example, a bichromal bead in an oil-filled capsule may rotate inside the capsule in response to the applied field. Additionally, the term "white" with respect to the color of a hemisphere in the rotatable element is not meant to be restricted to only the color white, but is to include any other variations as long as it is different from the color of the other hemisphere of the rotatable element, for example, gray.

It must also be noted that as used herein and in the appended claims, the singular forms "a," "an," and "the" include plural references unless the context clearly dictates otherwise. Thus, for example, reference to a "rotatable element" is a reference to one or more rotatable elements and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments of the present invention, the preferred methods, materials, and devices are now described.

Generally, the disclosure relates to display members having improved optical performance at elevated temperatures. In particular, rotatable elements of the display members include a purified polymer.

Figure 1:
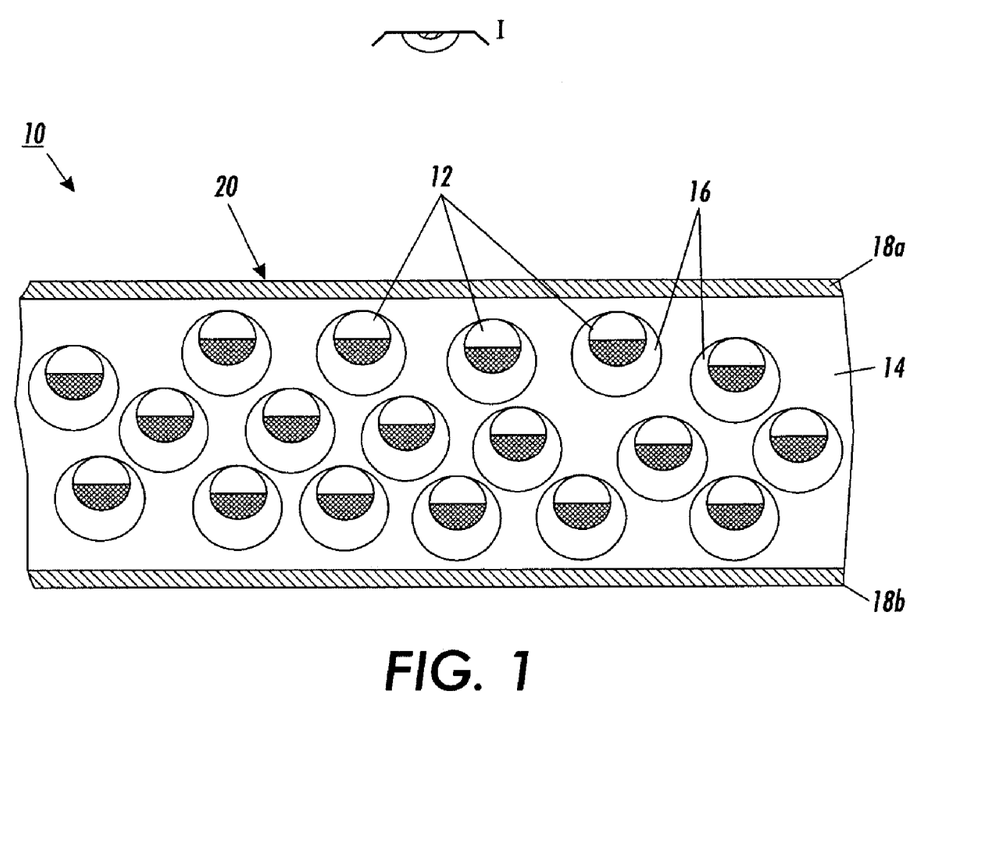
FIG. 1 illustrates a display member having rotatable elements.

An exemplary display member 10 is illustrated in FIG. 1. Rotatable elements 12 having a purified polymer are disposed in substrate 14 that is swelled by an enabling fluid, for example, a dielectric liquid, creating cavities 16 in which the rotatable elements 12 are free to rotate but are not free to translate substantially so as to disrupt the arrangement of rotatable elements. The rotatable elements 12 are electrically dipolar in the presence of the enabling fluid and so are subject to rotation upon application of an electric field, as by matrix-addressable electrodes 18a and 18b. The electrode 18a closest to upper surface 20 is preferably substantially transparent. An observer at I sees an image formed by the two-colored pattern (black and white being illustrated in the drawing) of the rotatable elements 12 as rotated to expose their black or white faces (hemispheres) to the upper surface 20 of substrate 14. The white hemispheres of the bichromal rotatable elements optionally may contain a spiropyran photochromic material, when exposed to radiation of the appropriate wavelength, these hemispheres of the rotatable elements can be switched from one color to another.

The rotatable elements of the present disclosure include a purified polymer. The purified polymer may be a polyalkylene wax, and particularly a polyethylene wax. The purified polyalkylene wax is then incorporated into rotatable elements to produce a display member of the present invention. The resulting display members are suitable for use in high temperature applications.

Commonly, a polyalkylene wax, such as a blend of polyethylene waxes, has different molecular weights. To form the purified polymer, materials identified as low molecular weight waxes (i.e., from about 300 to about 700 molecular weight polyalkylenes) by DSC are extracted. After extraction of the low molecular weight waxes, the remaining material or purified polyalkylene wax includes molecular weights from about 700 to about 3,000, including greater than about 1,000 molecular weight. This rotatable element having the purified polymer demonstrates superior tolerance towards leaching in silicone oil at elevated temperatures.

The base polymer commonly used in the production of rotatable elements is a crystalline polyethylene wax commercially available under the designation POLYWAX® 1000 (also designated as PW1000) from Baker Petrolite, Corp. However, once a display member is heated beyond about 50° C. and then brought back to room temperature, the display member/device performance is significantly reduced because a fraction of polyethylene wax dissolves into the silicone fluid inside the device at high temperatures. After cooling to room or ambient temperature, these leached materials are deposited back inside the device, which hinders the rotation of the rotatable elements.

Additionally, POLYWAX® 2000 (PW2000) is also a polyethylene wax made by Baker Petrolite. This material has also been used for producing rotatable elements because it has a higher melting point than PW1000 (about 126° C. vs about 113° C.) and is preferred for high temperature packages. However, rotatable elements made of PW2000 did not show any improvements when utilized in devices at elevated temperatures. Further investigation revealed that even though the leaching of PW2000 is less than PW1000 under identical conditions, the relatively small amount of leached materials is sufficient to hinder rotation of the bichromal balls.

Accordingly, it was determined that rotatable elements with purified polymers, for example, polymers having an average molecular weight greater than an initial average molecular weight, provided improved optical performance in display member at high temperatures. In other words, materials having low average molecular weights, for example, from about 300 to about 700 were extracted from the polymer to produce the purified polymer. Accordingly, the purified polymer has an average molecular weight of about 700 to about 3000.

In accordance with the present disclosure, the rotatable elements include a purified polymer or polyalkylene wax such as purified PW2000. That is, the rotatable element is made of a purified PW2000, for example. A purification process occurs, as described in U.S. patent application Ser. No. 10/919,814. For example, a hot solvent extraction of virgin PW2000 by ISOPAR®C at 85° C. may be utilized, whereby the low molecular weight fraction of PW2000 is successfully removed from the original polymer. Rotatable element devices of purified PW2000 do not show optical degradation at 78° C. for time periods of over 120 hours.

In this regard, polyalkylene waxes, such as POLYWAX® 1000 and 2000, are generally low molecular weight homopolymers, which are 100% linear and saturated and characterized by a molecular weight distribution (Mw/Mn) of approximately about 1.1. Because the POLYWAX® polyethylenes are linear and have a narrow molecular weight distribution (MWD), physical properties are highly co-related, such that the melting point and hardness are reportedly controlled by molecular weight alone.

The production process of such waxes is controllable to the extent that desired molecular weight products are obtained predictably and consistently. Product with number average molecular weights from about 450 to about 3000, with corresponding melting points of 80° C. to 132° C., are commercially available. Due to their 100% linearity and narrow molecular weight distribution, POLYWAX® polyethylenes characteristically display high crystallinity and sharp melting points.

All reference to rotatable elements hereinafter are directed to the rotatable elements having a purified polymer as described hereinabove.

Examples of suitable materials for substrate 14 include elastomers, such as SYLGARD.RTM. 184, available from Dow Corning, Midland, Mich., Stauffer and Wacker V-53 elastomer, and the like, as well as mixtures thereof. After the rotatable elements have been dispersed within the liquid elastomer, the elastomer is cured by any desired or effective method, such as application of heat, radiation, chemical curing, or the like. Materials other than elastomers are also suitable for the substrate 14, such as epoxies, rigid plastics, including polyethylene, polystyrene, plexiglass, or the like.

Examples of suitable enabling fluids include dielectric liquids such as paraffinic hydrocarbons, such as the ISOPAR.RTM. series available from Ashland Chemicals, including ISOPAR.RTM. L, ISOPAR.RTM. M, or the like, fluorinated hydrocarbons (both fully fluorinated and partially fluorinated), such as the fully fluorinated hydrocarbon perfluorooctane, the partially fluorinated hydrocarbon 3M HFE 7100 available from 3M, and the partially fluorinated polyethylene FREON.RTM. TF, vegetable oils, such as soybean oil, coconut oil, and the like, triglyceride liquids, such as tributyrin, tricaproin, and the like, silicon oils, such as DOW CORNING.RTM. 1 Centistoke 200 oil, 2 Centistoke 200 oil, and 10 Centistoke 200 oil, and the like, as well as mixtures thereof.

Spherical balls as the rotatable elements have a number of advantages. For example, spherical rotatable balls can be readily manufactured by a number of techniques, as disclosed in, for example, U.S. Pat. No. 5,262,098, U.S. Pat. No. 5,344,594, and other patents and patent applications referenced hereinabove, the disclosures of each of which are incorporated herein by reference. In addition, spheres are symmetrical in three dimensions, which means that fabrication of a display sheet from spherical particles is straightforward; the rotatable elements can be dispersed throughout an elastomer substrate, which is then swelled with enabling fluid to form spherical cavities around the rotatable elements. The spherical balls can be placed anywhere within the substrate, and at any orientation with respect to each other and with respect to the substrate surface. There is no need to align the rotatable elements with one another or with the substrate surface. Once in place, a rotatable element is free to rotate about any axis within its cavity.

Figure 2A:
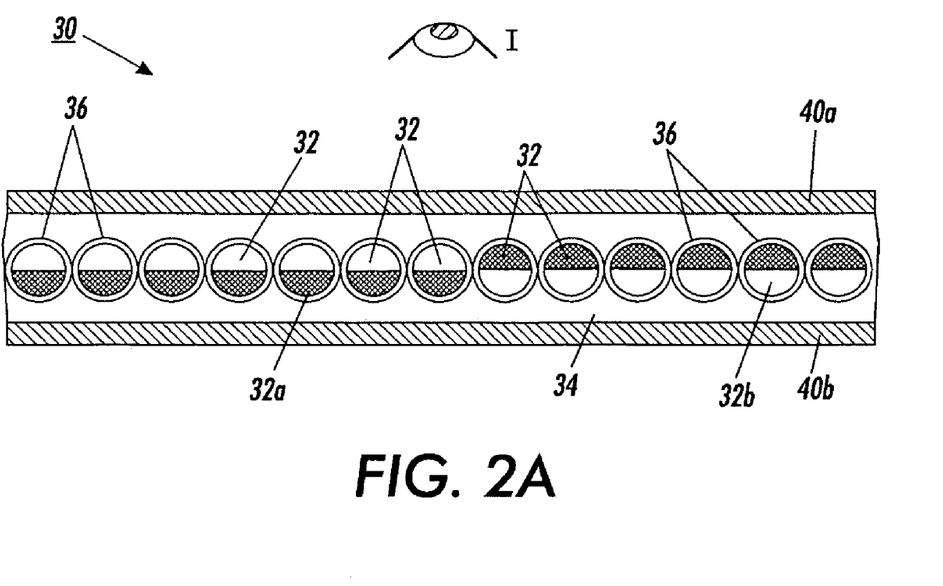
FIGS. 2a and 2b are, respectively, side and top views of a display member illustrating cylindrical rotatable elements arrayed in a monolayer configuration.
Figure 2B:
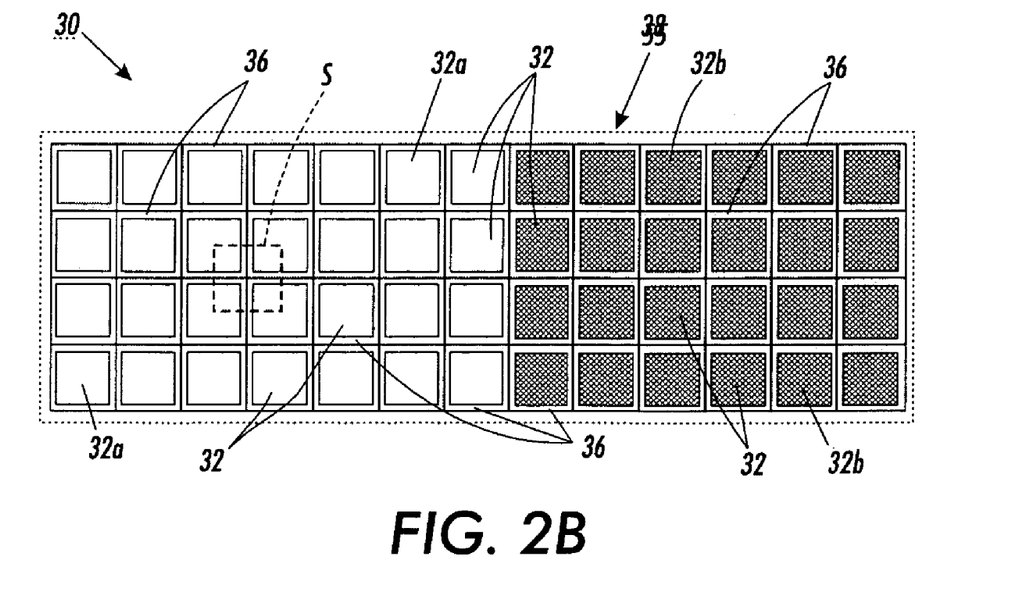

Rotatable elements of other than spherical shape are also suitable. Cylindrical rotatable elements, for example, are suitable. FIGS. 2a and 2b provide, respectively, side and top views of a display member 30 in an embodiment employing cylindrical rotatable elements. In display 30, rotatable cylinders 32 (in this drawing illustrated as being of unit (that is, 1:1) aspect ratio, although other aspect ratios are also acceptable) are arrayed in a monolayer array having a rectangular packing geometry. Preferably, cylinders 32 are placed as close to one another as possible in the monolayer. Cylinders 32 are situated in substrate 34, of a material such as an elastomer which is swelled by an enabling fluid (not shown) creating cavities 36 in which the cylinders 32 are free to rotate. The cavities 36 preferably are made as small as possible with respect to cylinders 32, so that the cylinders nearly fill the cavities. Also, cavities 36 preferably are placed as close to one another as possible, so that the cavity walls are as thin as possible. Preferably, cylinders 32 are of substantially uniform diameter and situated at a substantially uniform distance from upper surface 38. It will be appreciated that the arrangement of cylinders 32 and cavities 36 in display 30 minimizes both the center-to-center spacing and the surface-to-surface spacing between neighboring cylinders.

The white or lighter colored portions of the cylindrical rotatable elements illustrated in these Figures contain a spiropyran photochromic material according to an embodiment; when exposed to radiation of the appropriate wavelength, these portions of the cylindrical rotatable elements can be switched from one color to another.

Cylinders 32 are electrically dipolar in the presence of the enabling fluid and so are subject to rotation upon application of an electric field, as by matrix addressable electrodes 40a and 40b. The electrode 40a closest to upper surface 38 is preferably substantially transparent. An observer at I sees an image formed by the two-color (black and white illustrated in the drawing) pattern of the cylinders 32 as rotated to expose their black or white faces to the upper surface 38 of substrate 34. For example, the observer sees the white faces of cylinders such as cylinder 32a and the black faces of cylinders such as cylinder 32b.

The side view of FIG. 2a reveals the monolayer construction of display 30. The top view of FIG. 2b illustrates the rectangular packing geometry of cylinders 32 in the monolayer. The cylinders 32 appear as squares visible through upper surface 38. The centers of cylinders 32 form a square pattern, as shown by exemplary square S.

The projected areas of cylinders 32 in the plane of surface 38 preferably cover as much of the total area of the plane of surface 38 as possible. To this end, cavities 36 preferably are made as small as possible, ideally no larger than the cylinders themselves, or as close to this ideal as is consistent with proper cylinder rotation. The greater the ratio between the sum of the projected areas of the cylinders in the plane of viewing surface 38 and the total area of viewing surface 38, the greater the display reflectance and the brighter the display. It will be appreciated that, whereas the maximum area coverage theoretically possible with spherical balls of a single substantially uniform diameter, without interstitial smaller balls is about 90.7 percent, the maximum for cylinders is 100 percent. Thus, a display member made from a close-packed monolayer of cylinders can be made brighter than a display member made from a close-packed monolayer of spherical balls.

Other arrangements of cylindrical rotatable elements are also possible, such as cylinders arrayed in two or more layers in a substrate, cylinders with parallel longitudinal axes randomly distributed within a substrate, cylinders with random longitudinal axes randomly distributed within a substrate, cylinders arrayed in staggered arrays, or the like, as illustrated in, for example, U.S. Pat. No. 6,055,091, the disclosure of which is totally incorporated herein by reference. Cylindrical rotatable elements can also be prepared as disclosed in, for example, U.S. Pat. No. 6,055,091.

Figure 3:
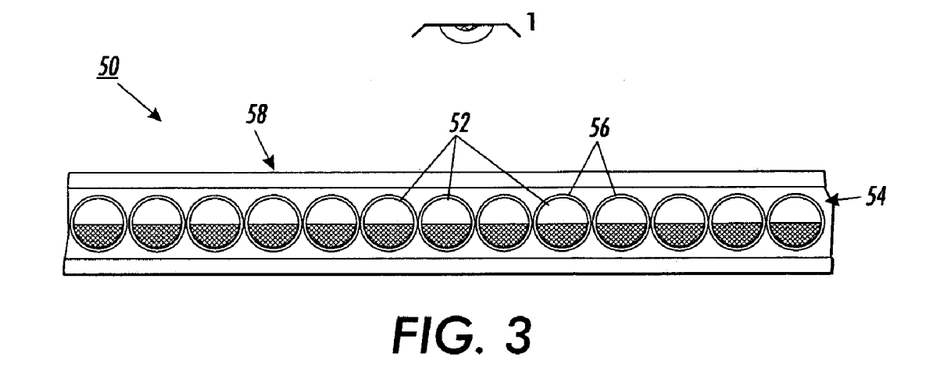
FIG. 3 illustrates a side view of a display member in an embodiment wherein the rotatable elements are arrayed in a closely-packed monolayer.

FIG. 3 provides a view of a display member 50 in another embodiment. In display 50, rotatable elements 52 are placed as close to one another as possible in a monolayer in elastomer substrate 54. Substrate 54 is swelled by an enabling fluid (not shown) creating cavities 56 in which the rotatable elements 52 are free to rotate. The cavities 56 preferably are made as small as possible with respect to rotatable elements 52, so that the rotatable elements nearly fill the cavities. Also, cavities 56 preferably are placed as close to one another as possible, so that the cavity walls are as thin as possible. Preferably, rotatable elements 52 are of substantially uniform diameter and situated at a substantially uniform distance from upper surface 58. It will be appreciated that the arrangement of rotatable elements 52 and cavities 56 in display 50 minimizes both the center-to-center spacing and the surface-to-surface spacing between neighboring rotatable elements. A preferred arrangement of the rotatable elements is a hexagonal array, although other arrays such as rectangular and rhomboid arrays are also suitable, as illustrated in, for example, U.S. Pat. No. 5,825,529, the disclosure of which is totally incorporated herein by reference. The white hemispheres of the rotatable elements illustrated in this Figure contain a spiropyran photochromic material according to the present invention, when exposed to radiation of the appropriate wavelength, these hemispheres of the rotatable elements can be switched from one color to another.

Closely packed monolayer display members can be fabricated by (1) creating a monolayer of rotatable elements according to known techniques, (2) preparing an elastomer sheet to contain the rotating elements, and (3) swelling the elastomer by application of a dielectric fluid.

A monolayer planar array of spheres of substantially uniform diameter inevitably has interstices between the spheres, even if the sphere surfaces touch one another. Light that passes through the interstices into the depths of the display is essentially lost. To prevent light loss through interstices in a monolayer array, in another embodiment a display member is constructed from two populations of rotatable elements. Preferably, rotatable elements in the first, or main, population are of a first substantially uniform diameter and rotatable elements in the second, or interstitial, population are of a second substantially uniform diameter, with the second diameter chosen so that the rotatable elements in the second population can fill the interstices left by close-packing the rotatable elements from the first population.

Figure 4:
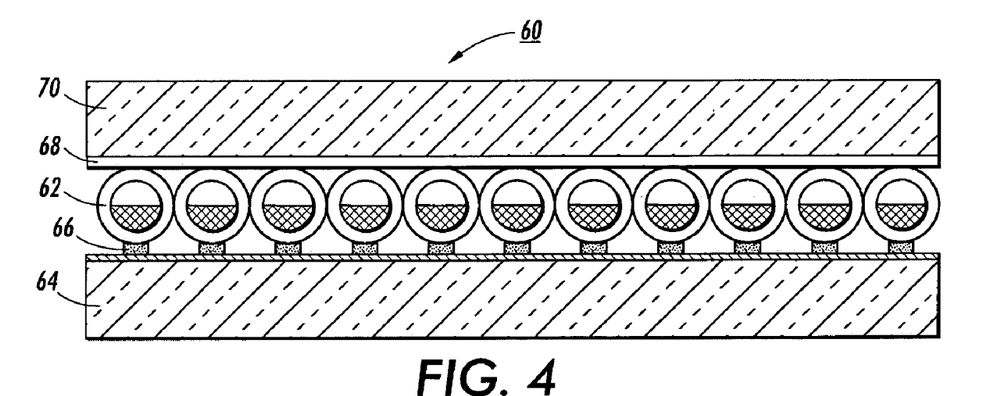
FIG. 4 illustrates a side view of a display member with a monolayer of rotatable elements in another embodiment.

FIG. 4 illustrates a display member 60 according to another embodiment of the present disclosure. The display member includes an image formation layer that includes a single layer, or monolayer, of encapsulated particles or rotatable elements 62 positioned atop a conductive substrate 64. The conductive substrate 64 may be paper, conductive plastic, a printed circuit board or other material that may apply or pass a field to selected particles in the image formation layer. Between the rotatable elements 62 and the substrate 64 is a patterned adhesive layer 66. The particles may be positioned atop the adhesive layer 66 or at least partially embedded within the adhesive layer 66. The particles are covered with an overlayer, such as conductive material 68 that may act as a counterelectrode. The counterelectrode may be, for example, indium tin oxide (ITO) that is positioned on or under transparent layer 70. Together, the layers form a re-addressable display material in which the particles rotate in response to an electric or magnetic field that is applied to the image formation layer via the conductive substrate. The counterelectrode may be used to vary the field.

The rotatable element 62 may be or may contain any bichromal or multichromal display materials such as bichromal beads, electrophoretic particles, twisting cylinders and the like. The size of the capsules is preferably substantially uniform. When bichromal, the capsules and/or beads within the capsules are one color (such as white) on one surface and a different color (such as black) on the other surface. Multichromal capsules may have different configurations. For signage applications, the diameter of the capsules may be approximately 120 microns (μm), within which bichromal beads having a diameter of approximately 100 μm may be contained. Other capsule and particle sizes are possible within the invention.

The rotatable elements 62 form a closely-packed monolayer configuration on the patterned adhesive layer 66. The closely-packed monolayer configuration minimizes absorption of the scattered light by the black or darker hemispheres, resulting in substantial improvement in brightness.

Figure 5:
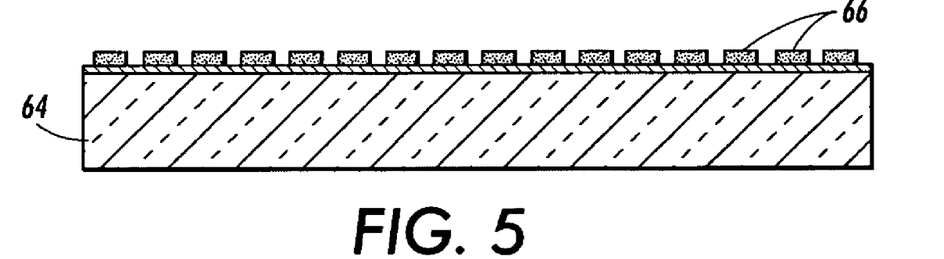
FIG. 5 illustrates a side view of a substrate for a display member with a patterned adhesive layer positioned atop the substrate.

By providing a patterned adhesive layer 66, the rotatable elements 62 may be anchored according to a pre-determined geometry that improves or maximizes packing density of the monolayer of capsules. For example, as illustrated in FIG. 5, the adhesive layer 66 may be patterned to provide raised elements at positions that are separated from each other at distances that are just slightly more than the diameter of the capsules. Thus, as illustrated in FIG. 4, when the adhesive layer 66 receives the rotatable elements 62, the rotatable elements are positioned in a closely packed monolayer.

As indicated above, various patents describe making rotatable elements and display members. Exemplary patents include, but are not limited to U.S. Pat. Nos. 6,549,327 and 6,795,228, and application Ser. No. 10/397,017, filed Mar. 25, 2003 and application Ser. No. 10/886,377, filed Jul. 7, 2004, all of which are herein incorporated by reference.

EXAMPLE

The following describes fabrication of a display sheet using rotational elements formed from purified polywax.

Fabrication of Display Sheet (Sample AA569): Sylagrd 184 mixture (1.5:10 curing/resin from Dow Corning) was mixed together followed by addition of same weight of bichromal beads. After removing bubbles, the mixture was spread over a carrier substrate, sheet then cured at about 90° C. for about 2 hours. This was cooled to room temperature, then a 4"×6" sheet was ultrasonicated for about 10 minutes. The contrast ratio was measured using (ITO-Mylar/Mylar)/PCB pillow configuration.

The results were as follows. Three samples made of three different types of polywaxes were tested side by side: polyethylene of 1000 (PW1000), unpurified polyethylene of 2000 (Unpurified PW2000), and purified polyethylene of 2000 (Purified PW2000). PW1000 beads stopped rotating in 1 hour after placed in the oven at about 78° C. As illustrated in Tables 1 and 2 below, unpurified PW2000CR beads stopped rotating after 48 hours and purified PW2000 beads sustained its contrast ratio.

TABLE 1

Unpurified PW2000

AA531, XRCC531

|  | 60 V | 80 V | 100 V | 125 V |
|---|---|---|---|---|
| Time zero | 2.13 | 3.45 | 4.31 | 4.49 |
| 48 hrs | 1.16 | 1.34 | 1.55 | 1.86 |

TABLE 2

Purified PW2000

AA569, XRCC94

|  | 60 V | 80 V | 100 V | 125 V |
|---|---|---|---|---|
| Time zero | 3.67 | 3.91 | 3.76 | 3.57 |
| 48 hrs | 3.55 | 3.64 | 3.56 | 3.40 |
| 120 hrs | 3.26 | 3.60 | 3.60 | 3.50 |

As seen, the contrast ratio of the unpurified PW2000 polyethylene samples substantially dropped after about 48 hours. The purified polyethylene samples of the disclosure, however, demonstrated sustained contrast ratio exceeding about 48 hours. Moreover, the purified polyethylene purified PW2000 device made in accordance with the disclosure showed no optical performance degradation after cycling at about 78° C. over about 120 hours. Interestingly, the unpurified PW2000 devices rotated much better at 78° than at room temperature. This is consistent with the "precipitation model" for contrast ratio loss in this system, i.e. soluble polywax precipitates out in the capsule thereby inhibiting room temperature bead rotation.

Prior to the present disclosure, display devices typically exhibited a 40° C. upper limit operating temperature. Therefore, such devices were generally only used for the indoor signage market. In order to provide outdoor signage, external cooling units were often required which is costly and hampers large scale testing. By utilizing purified polymers, i.e., PW2000, high quality rotatable elements are successfully prepared. Devices of purified rotatable elements have shown superior high temperature tolerance. This new package of materials can significantly expand the operating limits of display members.

Embodiments of the present invention may provide numerous advantages. In addition, to the use of display members at elevated temperatures. For example, rotational elements produced by different batches produces increased batch in critical variability which in turn effects spinning conditions. The batch variability is mainly due to changes in the distribution of polyethylene. By extracting the low molecular weight materials as described in the disclosure, molecular weight distribution is decreased which in turn decreases the problems associated with batch variability.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A display member, comprising:
an arrangement of a plurality of optically anisotropic rotatable elements comprising a purified polymer, wherein the purified polymer comprises a polyalkylene, wherein the polyalkylene comprises at least one polyethylene wax, the plurality of rotatable elements having a surface in contact with an enabling fluid, the rotatable elements being electrically dipolar in the presence of the enabling fluid and being subject to rotation upon application of an electric field.

2. The display member according to claim 1, wherein the purified polymer comprises polyalkylenes having molecular weights from about 700 to about 3,000.

3. The display member according to claim 1, wherein the purified polymer has an average molecular weight greater than an initial average molecular weight.

4. The display member according to claim 1, wherein the purified polymer prevents leaching into the enabling liquid.

5. The display member according to claim 1, wherein at least one material having an average molecular weight of less than about 700 is extracted from the rotatable elements to form the purified polymer.

6. The display member according to claim 1, wherein the enabling fluid comprises a dielectric liquid.

7. The display member according to claim 1, wherein the display member operates at a temperature greater than at least about 40° C.

8. A display member, comprising:
an arrangement of a plurality of optically anisotropic rotatable elements comprising a purified polymer, wherein the purified polymer has an average molecular weight greater than an initial average molecular weight, the plurality of rotatable elements having a surface in contact with an enabling fluid, the rotatable elements being electrically dipolar in the presence of the enabling fluid and being subject to rotation upon application of an electric field.

9. The display member according to claim 8, wherein the purified polymer comprises a polyalkylene.

10. The display member according to claim 9, wherein the polyalkylene comprises at least one polyethylene wax.

11. The display member according to claim 9, wherein the purified polymer comprises polyalkylenes having molecular weights from about 700 to about 3,000.

12. The display member according to claim 8, wherein the purified polymer prevents leaching into the enabling liquid.

13. The display member according to claim 8, wherein at least one material having an average molecular weight of less than about 700 is extracted from the rotatable elements to form the purified polymer.

14. The display member according to claim 8, wherein the enabling fluid comprises a dielectric liquid.

15. The display member according to claim 8, wherein the display member operates at a temperature greater than at least about 40° C.

* * * * *